March 28, 1961
C. T. DYE, JR
2,976,833
CONTROL MECHANISM FOR ACTUATING RUDDERS
Filed Nov. 4, 1958
5 Sheets-Sheet 1
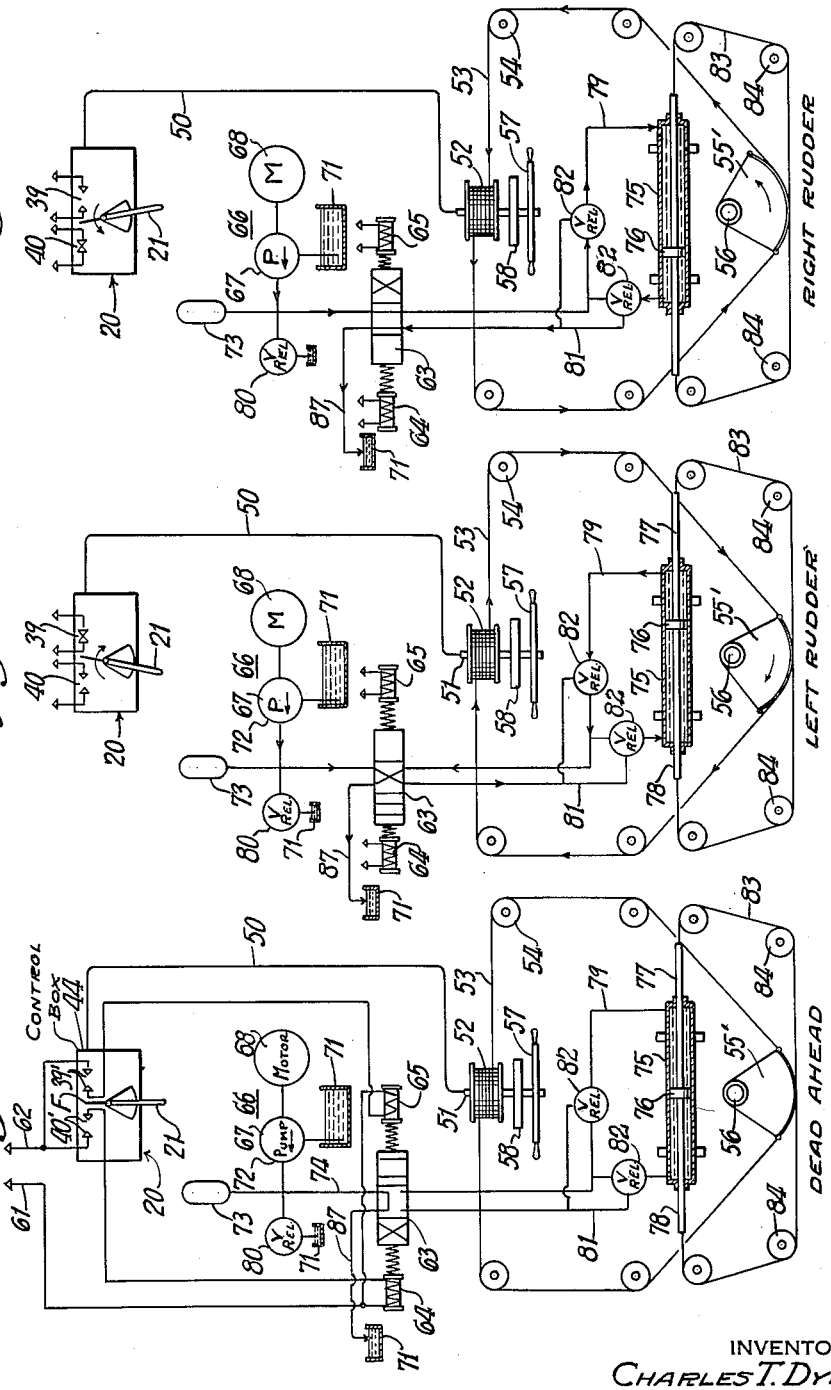
INVENTOR
CHARLES T. DYE Jr.
BY
Benjamin Swedler
ATTORNEY March 28, 1961  C. T. DYE, JR  2,976,833
CONTROL MECHANISM FOR ACTUATING RUDDERS Filed Nov. 4, 1958  5 Sheets-Sheet 2

INVENTOR
CHARLES T. DYE Jr.
BY
Benjamin Sweedler
ATTORNEY

March 28, 1961  C. T. DYE, JR  2,976,833
CONTROL MECHANISM FOR ACTUATING RUDDERS
Filed Nov. 4, 1958  5 Sheets-Sheet 3
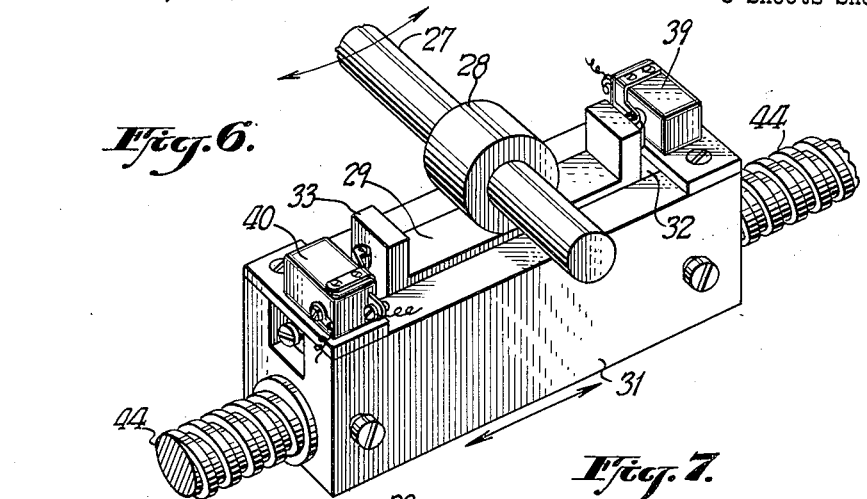
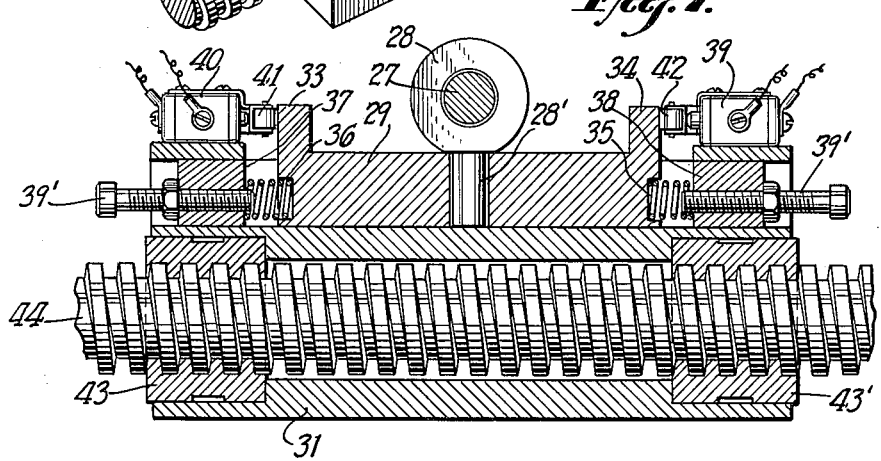
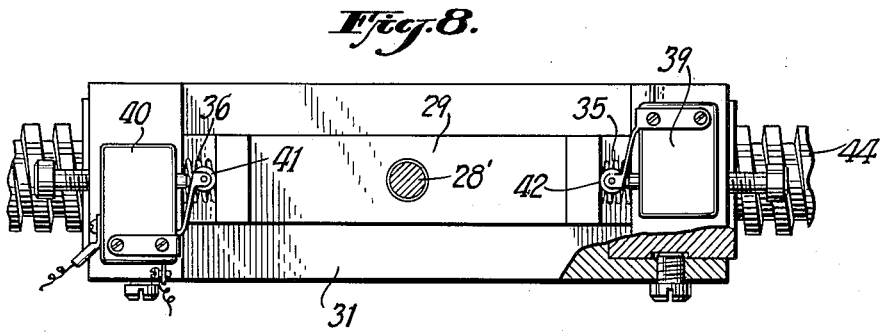
INVENTOR
CHARLES T. DYE Jr.
BY
Benjamin Sweedler
ATTORNEY

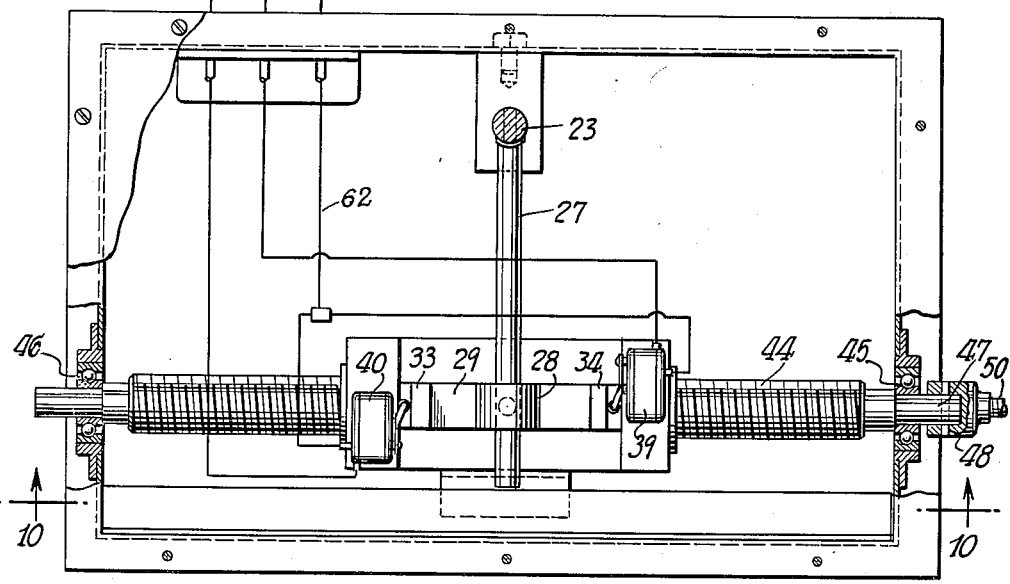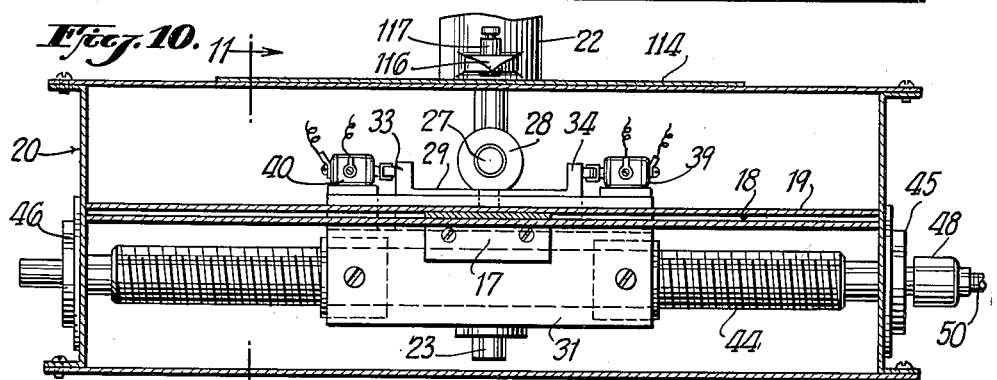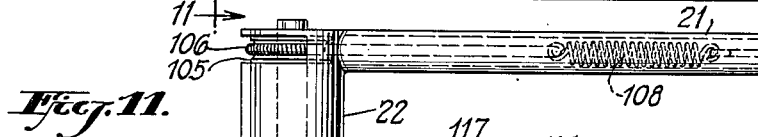

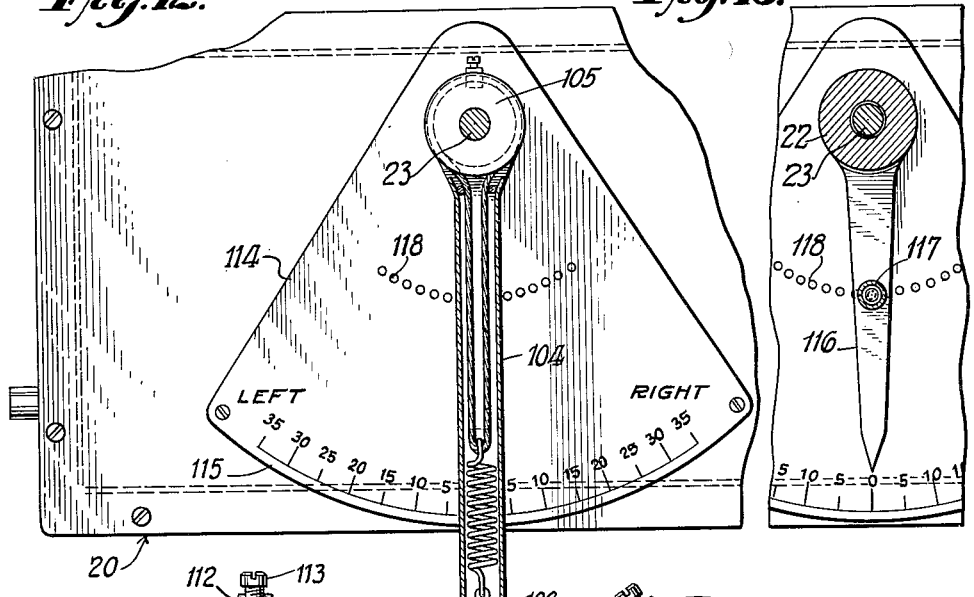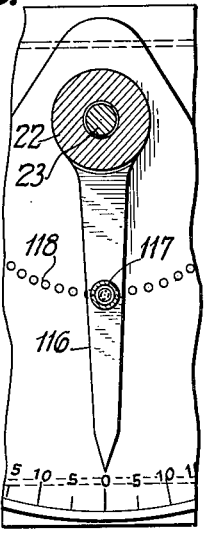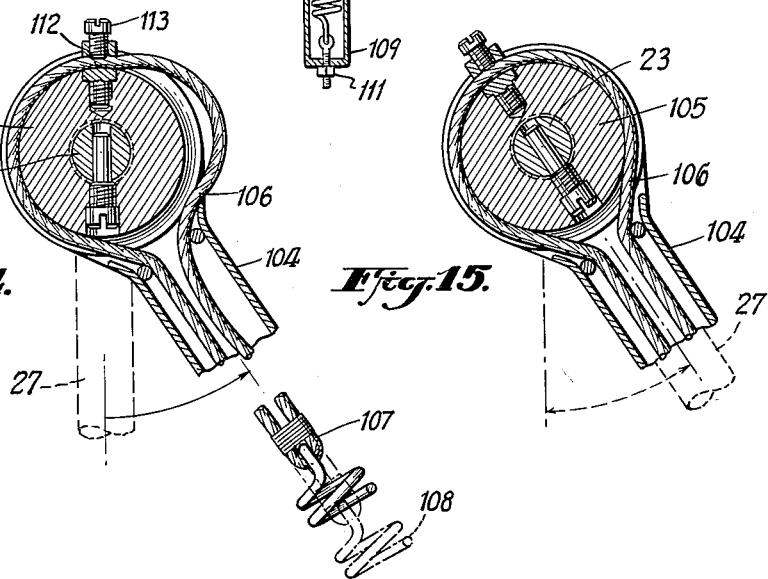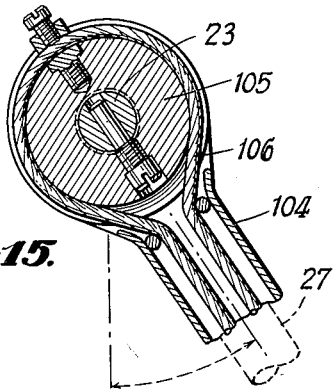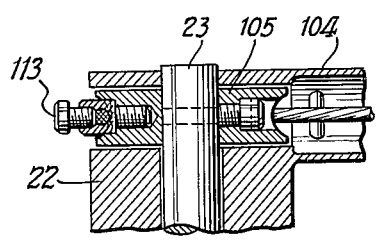

United States Patent Office 2,976,833
Patented Mar. 28, 1961

2,976,833
CONTROL MECHANISM FOR ACTUATING RUDDERS

Charles T. Dye, Jr., New Orleans, La., assignor to John L. Fitzhugh, New Orleans, La.

Filed Nov. 4, 1958, Ser. No. 771,835

7 Claims. (Cl. 114—144)

This invention relates to control mechanism for actuating rudders on power craft including marine vessels, land vehicles of special design equipped with rudders, aircraft, etc. It will be understood the expression "rudders" is used in a broad sense and includes flaps, wings, etc., such, for example, as are employed in aircraft and which are actuated either for steering purposes, braking purposes to reduce the speed of the vehicle, stabilizing purposes, steering, etc.

In order to simplify the description of this invention, that which follows will be confined, for the most part, to the adaptation of the present invention to marine vessels, but it will be understood the invention is not limited thereto.

It is among the objects of the present invention to provide a controller for operating a rudder, particularly a steering controller, of exceptionally simple design, the operation of which will be clear to even unskilled personnel of reasonable intelligence, which controller can readily be installed on existing craft as well as on new craft, and which controller is so designed that its performance is reliable under normal conditions of operation including reasonable deviations from such normal conditions.

It is another object of this invention to provide such controller, the parts of which are readily accessible so that in the event of any malfunctioning of the component parts, it is easy to locate the source of trouble and make the necessary repairs should they become necessary.

Still another object of this invention is to provide such controller constituted entirely, or almost entirely, of components which are readily available, thus simplifying the assembling of the controller and reducing its initial cost as well as the expense involved in making repairs should they become necessary.

Other objects and advantages of this invention will be obvious from the following detailed description thereof.

In the preferred embodiments illustrated on the drawings, the invention is shown incorporated in a marine steering device in which the rudder is actuated either by a pressure fluid motor or by an electric motor, and the description which follows will be confined to these illustrated embodiments of the invention. It will be understood, however, that the novel features and improvements are susceptible of other applications such, for example, as controllers in which instead of electric switches for actuating the valve mechanism controlling the flow of pressure fluid to the rudder actuator or the switches for energizing the electric motor actuating the rudder, fluid, including air and hydraulic pilot valve control switches are employed. Hence the scope of this invention is not confined to the embodiments herein described.

In the accompanying drawings forming a part of this specification, and showing, for purposes of exemplification, preferred forms of this invention, without limiting the claimed invention to such illustrative instances:

Figure 1 is a diagrammatic view of a steering controller embodying this invention with the rudder in the "dead ahead" position;

Figure 2 is a similar diagrammatic view with the rudder in the "left rudder" position;

Figure 3 is a similar diagrammatic view with the rudder in the "right rudder" position;

Figures 1, 2 and 3 show a pressure fluid motor for actuating the rudder;

Figure 6 is a perspective view, fragmentary in character, showing the actuator slide block, follower block and associated parts of the controller;

Figure 7 is a vertical section through the actuator slide block and follower block assembly of Figure 6;

Figure 8 is a top plan view of the actuator slide block and follower block assembly shown in Figure 6;

Figure 9 is a plan view of the controller box containing the controller mechanism, namely, the actuator slide block, follower block and associated parts;

Figure 10 is a vertical section taken in a plane indicated by line 10—10 on Figure 9;

Figure 11 is a vertical section through the controller box and associated parts taken in a plane indicated by line 11—11 on Figure 10;

Figure 12 is a fragmentary plan view of a tiller arm and associated mechanism, spring tensioned so that the tiller arm can be turned to any desired angle and held in that position to give any desired angle of movement of the rudder;

Fig. 13 is a fragmentary plan view of the pointer associated with the tiller arm to show the rudder position at all times;

Figure 14 shows a fragmentary horizontal section, partly in elevation of the tiller arm of Figure 12 in the right rudder position. It illustrates the torsional action of the cable and tiller arm on the post which carries the follower rod effecting movement of the actuator slide block;

Figure 4:
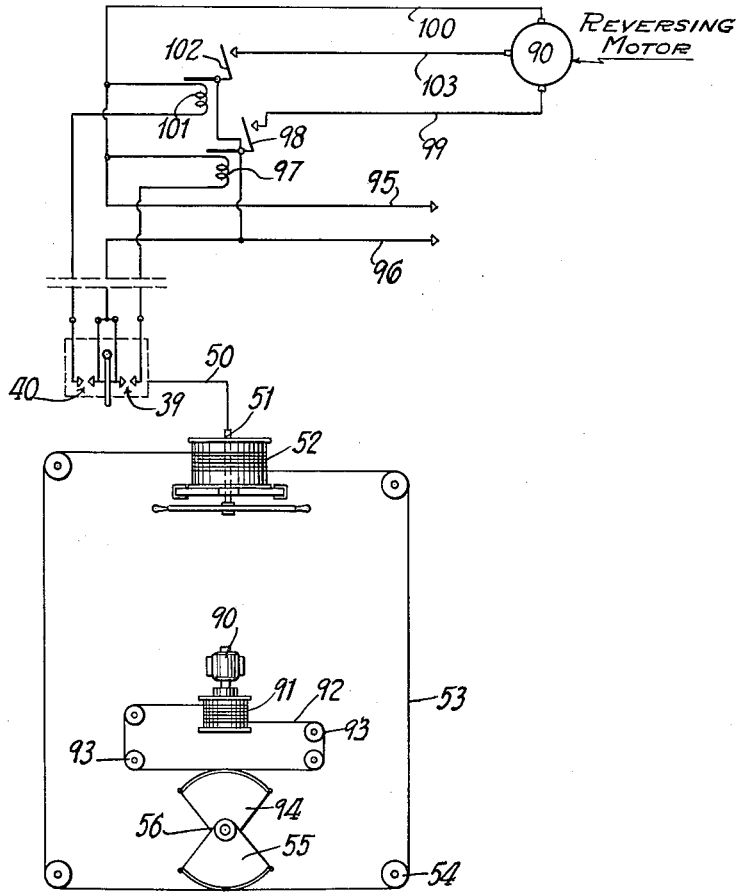
Figure 4 is a diagrammatic view of the steering mechanism embodying this invention in which the rudder is actuated by an electric motor.

Figure 15 is a fragmentary horizontal section of the tiller arm shown in Figure 14 with the cable in the position where it no longer exerts any torsional action on the post carrying the follower rod; and Figure 15a is a fragmentary sectional view through the end of the tiller arm mounted on the post carrying the follower rod and shows the mounting of the sheave carrying the tensionable cable on this post.

Referring first to Figures 6 to 11 of the drawings, the controller assembly is contained in a container or box 20 which can be suitably positioned in any part of the vessel, desirably but not necessarily in the pilot house. In the embodiment shown in the drawings this controller assembly is associated with a tiller arm 21 which is positioned above the top of the box 20 and may be preset so that it always occupies the same relative position as the rudder or rudders controlled thereby. The tiller arm 21 is fixed to the upper end of a boss 22 mounted for rotary movement on a post or shaft 23 journaled in a bearing block 24 (Figure 11), suitably mounted on side 25 of controller box 20. Desirably, a collar 26 is adjustably pinned to post 23 to maintain this post in bearing block 24. Tiller arm 21 may be directly secured to post 23 to effect rotary movement of this post in its bearing 24 rather than have the tiller arm carried by the upper end of boss 22, as shown clearly in Figure 11. The contruction in Figure 11, as hereinafter described more fully, involves spring tension mechanism for actuating a follower rod 27, so that the tiller arm can be turned to any desired angle and automatically held in that position until the rudder is moved to the same angle. Where movement of the tiller arm to a fixed position under spring tension to effect any desired angle of movement of the rudder is not desired, but it is desired to operate the tiller arm manually to effect the desired rudder movement, tiller arm 21 can be a simple lever or arm secured directly to the post 23 to effect actuation of this post 23.

Integral with or suitably secured to the post 23 is a follower rod 27 which extends from post 23 in the same general direction as the tiller arm 21.

As best shown in Figures 6 and 7, the follower rod 27 extends through an eye 28 having a short cylindrical stem 28' at its base which stem fits snugly and swivels in a hole in the actuator slide block 29 which in turn is mounted for sliding movement in the follower block 31. The follower rod 27 slides inside the eye 28 as the follower block 31 moves, causing a slight swivelling of the eye 28. The follower block 31 has a channel 32 formed in its upper surface in which actuator slide block 29 is mounted for sliding movement back and forth in both a right and left hand direction viewing Figure 6. The engaging surfaces of the side walls of actuator slide block 29 and of the channel 32 are machined to permit smooth travel of the actuator slide block 29 in channel 32. Actuator slide block 29 is centered within channel 32 by centering springs 35, 36 which are confined within an opening in the end walls of the actuator slide block 29 and the upstanding portions 37 and 38 of the follower block 31 as best shown in Figure 7. The pressure these springs 35 and 36 exert on the ends of the actuator slide block 29 maintain the slide block 29 in centered position. The adjusting bolts 39' provide an adjustable stop in either direction for the actuator slide block 29.

Mounted on upstanding portions 37 and 38 of the follower block 31 are a pair of micro switches 39 and 40. In the embodiment of the invention shown in the drawings, these micro switches are adapted to be actuated by roller surfaces 41, 42 arranged to be contacted by the upstanding portions 33, 34 respectively of the actuator slide block 29. This actuator slide block is actuated as hereinafter more fully described to effect closing of the switches. While micro switches have been shown, it will be understood that instead of such switches, air or hydraulic pilot valve control switches can be used. The switches shown are of standard type readily available. When roller surfaces 41 and 42 are contacted by the upstanding portions 33, 34 of the actuator slide block 29, respectively, the switches are closed by moving the spring contacts carrying the rollers 41 and 42 into engagement with the cooperating contacts of the micro switches 39 and 40. Once the pressure exerted by the upstanding portions 33, 34 is relieved, the switches 39 and 40 open automatically under the action of the centering springs 35, 36.

Follower block 31 has nuts 43 and 43' (Figure 7) at its opposite ends; these nuts are internally threaded for engagement with a threaded controller screw 44. As best shown in Figures 9 and 10, controller screw 44 is mounted for rotation in bearings 45, 46 carried by the side walls of box 20. Follower block 31 (Figure 11) is guided in its movement effected by actuation of controller screw 44, by means of an angle member 17. One wall of this angle member is fastened to the follower block 31 and the other wall of this angle member 17 is mounted for sliding movement in the guide slot 18 provided by the angle arms 19 bolted or otherwise suitably secured to wall 20' of the box 20.

End 47 of the controller screw has a flexible drive cable 50 suitably fastened thereto through a universal joint 48 (Figure 9). Drive cable 50, as shown in Figures 1 and 3, is communicably connected with shaft 51 on which is mounted the windlass 52. As conventional, a cable 53 passing over sheaves 54 is wound and unwound on this windlass 52. Cable 53 thus actuates the rudder sector or quadrant 55 (Figure 5) fixed to the rudder post 56. A steering wheel 57 (Figure 1) for manual steering when desired, may be keyed to the shaft 51; preferably this steering wheel 57 is clutched to shaft 51 through clutch 58. When this clutch is in the non-driving position, the steering wheel 57 is stationary even though shaft 51 is driven by cable 53. Upon rotation of steering wheel 57 in either clockwise or counterclockwise direction, with clutch 58 in the driving position, windlass 52 is turned to move the cable 53 to actuate the rudder post and the rudder carried thereby.

When the windlass 52 is moved by the steering wheel 57, drive cable 50 is simultaneously actuated to effect rotation of the controller screw 44. The direction of rotation of controller screw 44 will of course depend on the direction of rotation of the windlass 52. Thus, in one direction of rotation, controller screw 44 is rotated to effect movement of the follower block 31 from right to left viewing Figure 7 and in the other direction of rotation, follower block 31 is moved from left to right. Where provision for manual steering is desired, the hand wheel 57 is employed; if it is desired to utilize only power steering, this hand wheel may be eliminated or disengaged from windlass 52 by clutch 58.

In Figures 1 to 3, inclusive, the contacts 39' represent diagrammatically the contacts of micro switch 39 and the contacts 40' represent diagrammatically the contacts of microswitch 40. The actuator slide block 29, which upon movement in a right hand direction viewing Figure 6 effects closing of switch 39 and upon movement in a left hand direction effects closing of switch 40, is indicated diagrammatically in these figures by the element F. It will be noted from Figure 1 that the switches 39 and 40 are in electrical circuit through suitable leads 61, 62 with a source of current; in the interests of simplifying Figures 2 and 3 these leads are not shown in these figures. In circuit with the switches 39 and 40 are the solenoids 64 and 65 which actuate a directional valve 63.

Directional valve 63 controls the flow of pressure fluid in the pressure fluid system 66, comprising a pump 67 driven by a motor 68. Pump 67 communicates with a reservoir 71 through an unloading or relief valve 80 and also communicates with directional valve 63. An accumulator 73 maintains pressure in the system in event the pump 67 is not working; accumulator 73 also communicates with a reservoir 71 through relief valve 80. In the drawing a number of reservoirs 71 have been shown, but it will be understood they may be one and the same or suitably interconnected. A line 74 leads from the pumps 67 and the accumulator 73 to the directional valve 63.

A double acting hydraulic cylinder 75 (or two single acting hydraulic cylinders actuating in opposite directions) having a piston 76 provided with the piston stems 77, 78 extending from the opposite sides thereof, is connected with the directional valve 63 by lines 79 and 81. Desirably, a relief valve 82 is positioned in lines 79 and 81 to prevent overloading or excessive pressures on the cylinder 75 in the event that the rudder is forced to change position by hitting a hard object or running aground. Such forced movement of the rudder when locked in neutral or dead-ahead position shown in Figure 1 might break or stretch the cable 83 actuated by the cylinder 75 which would necessitate adjustment or repairs. Excessive pressure on either line 79 or 81 causes fluid to bleed through relief valve 82 into the other line. Cable 83 actuated by cylinder 75 travels over the sheaves 84 and is connected to the rudder quadrant or sector 55' to effect its movement either from right to left or left to right, depending upon the direction of movement of piston 76 in cylinder 75, which direction of movement, as hereinafter more fully explained, depends upon the setting of directional valve 63 by the solenoids 64 and 65.

Figure 5:
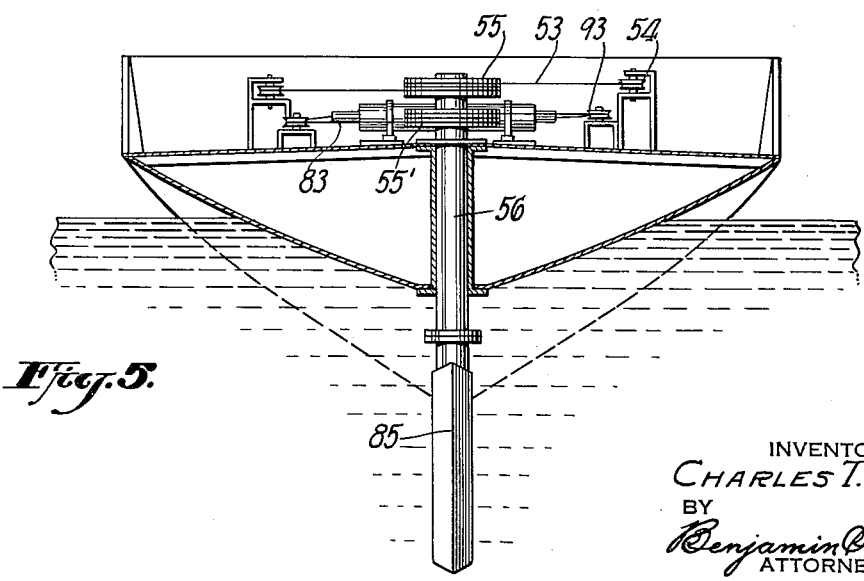
Figure 5 is a vertical section partly in elevation showing the end portion of the marine vessel including the rudder post, a rudder mounted thereon, the actuating sheaves and associated cables for actuating this post either through manual or power operation.

Movement of the rudder sector 55', it will be appreciated, effects movement of the rudder post 56 to which, as best shown in Figure 5, the rudder 85 is secured. As shown in Figure 5, the rudder post 56 has fixed thereto the rudder sector 55' actuated by the cable 83. As shown in Figure 4, where the vessel is equipped for electric motor steering and manual steering also, it is provided with a second rudder sector 94 actuated by the cable 92 passing over the sheaves 93. In the diagrammatic views of Figures 1 to 3 only one rudder sector is shown in the interests of simplicity.

In Figure 1 the directional valve 63 is shown in the dead-ahead or neutral position of the rudder. In this position of valve 63 no flow takes place through lines 79 and 81, and pressure fluid from line 74 flows back to reservoir 71. Hence, the rudder sector 55' is locked in the position shown in Figure 1 under the influence of the pressure fluid on the opposite sides of the piston 76 in cylinder 75.

Should it be desired to move the rudder to the left, the tiller arm 21 is moved to the left as shown in Figure 2. This effects closing of switch 39 with consequent energization of the solenoid 65 actuating the directional valve 63 to cause flow therethrough to take place into line 81 moving the piston 76 from left to right as shown in Figure 2. Pressure fluid exhausts from cylinder 75 through line 79, relief valve 82 to line 87 into the reservoir 71. The rudder is thus moved to the left and maintained at the desired angle by the pressure fluid in the hydraulic cylinder 75.

As long as pressure is maintained on the tiller arm 21 the switch 39 remains closed and pressure fluid flows to hydraulic cylinder 75 as hereinabove described, to actuate rudder sector 55' through the cable 83 to move the rudder to the left. Substantially simultaneously drive cable 50 is moved whenever the rudder post 56 is moved (through cable 53, windlass 52 and shaft 51) to effect actuation of the controller screw 44 to move the follower block 31 to restore the follower block 31 to the same relative position with respect to the actuator slide block 29. In this equilibrium position of these two members, unless pressure is applied to the tiller arm, the switches 39 and 40 remain open and neither solenoid 65 nor 64 is energized and directional valve 63 by spring tension returns to the position shown in Figure 1 with the fluid locked in the flow lines 79 and 81 and cylinder 75. The rudder 85 may thus be locked in any angular position.

If it is desired to move the rudder 85 to the right rudder position, shown in Figure 3, the tiller arm 21 is moved from left to right, as shown in Figure 3. This effects closing of switch 40 which energizes the solenoid 64 actuating the directional valve 63 to permit flow of pressure fluid to take place through line 79 into the right hand end of cylinder 75 and pressure fluid to exhaust from the left hand end of cylinder 75 through line 81 and through directional valve 63 into line 87 leading to the reservoir 71. The rudder is thus moved and maintained in the right rudder position.

In the modification of Figure 4, rudder sector 94 keyed to the rudder post 56 is actuated by a reversing electric motor 90 which drives windlass 91. Motor 90 drives the shaft on which windlass 91 is mounted. In the interests of clarity of illustration, this motor is shown in the wiring diagram shown on Figure 4 and also in association with windlass 91. This, of course, is for purposes of simplifying the showing of Figure 4; actually, only one motor is employed in circuit with switches 39 and 40, as hereinafter more fully described.

Windlass 91 has wound thereon an operating cable 92 passing over sheaves 93. Cable 92 drives the rudder sector 94. This modification involves the utilization of rudder sector 55 which through cable 53 wound on windlass 52 effects movement of this windlass and thus effects actuation of the flexible drive cable 50, which, as above described, is operatively connected with the windlass shaft 51.

In Figure 4 the switches 39 and 40 are in circuit with the main power lines 95 and 96. Switch 39 is in circuit with a relay 97 which actuates the switch 98. When relay 97 is energized, switch 98 is closed; the circuit containing relay 97 and switch 98 includes lines 99 and 100, and reversing motor 90. When switch 98 is closed due to the closing of switch 39 effected by the tiller arm 21, motor 90 is energized to rotate in one direction to move the rudder 85 in that direction.

Switch 40 is in circuit with a relay 101 which, when energized, effects closing of switch 102 in circuit through line 103 and line 100 with the reversing motor 90. When switch 102 is closed, reversing motor 90 is energized to rotate in the opposite direction to effect movement of the rudder 85 in the opposite direction.

Whenever the rudder post 56 is turned by actuation of the reversing motor 90, cable 53 is actuated to rotate the windlass 52, thus actuating the drive cable 50 to effect rotation of the controller screw 44 and movement of follower block 31, which movement, as above explained, continues as long as one of the switches 39, 40 is closed by the tiller arm 21 putting pressure on the actuator slide block 29. As long as pressure is exerted through the tiller arm 21 on the actuator slide block 29 in either a right hand or left hand direction, viewing Figure 7, switch 39 or 40 respectively is closed causing actuation of the rudder in the desired direction. Simultaneously, the follower block 31 is moved by the controller screw 44 in the same direction at which pressure contact is made by the actuator slide block 29 on the microswitch 39, 40. Once this pressure is relieved, the switch 39 or 40, which had been closed while the pressure was applied, automatically opens the directional valve 63, blocks the inlet and outlet lines 79 and 81 to and from the cylinder 75, and the rudder is locked in position under the action of the pressure fluid in cylinder 75 in the modifications of Figures 1 to 3 inclusive and under the action of the reversing motor 90 through windlass 91 and drive cable 92, in the modification of Figure 4.

In other words, in the modifications of Figures 1 to 3 inclusive, when the follower block 31 actuated by the controller screw 44 reaches the point where pressure is no longer exerted by the tiller arm 21 through the actuator slide block 29 on the switch 39 or 40 as the case may be, pressure fluid is locked in the system and the pressure cylinder 75 holds the rudder 85 in fixed position until the tiller arm 21 is again actuated to close switch 39 and 40 depending upon whether movement of the rudder 85 in a left or right hand direction is desired. The action in the case of the modification of Figure 4 is the same except that the rudder 85 is held in place by the reversing motor 90 and associated parts.

From the above description, it will be appreciated that for a small movement of the rudder the operator merely taps the tiller arm slightly. As soon as the operator no longer applies pressure to the tiller arm, movement of the follower block 31 continues until there is no pressure to close the contact of the microswitch 39 or 40 thereby causing the switch, which had previously been closed, to open; the rudder 85 is then maintained locked in the position to which it had been moved.

For large movement of the rudder 85, pressure must be continuously maintained against the tiller arm until the desired movement of the rudder has been effected.

By adjusting the bolts holding the microswitches 39 and 40 on which the roller contacts 41 and 42 are mounted, the amount of play, before effecting closing of switches 39, 40 can be modified as desired.

The modifications of Figures 12 to 15 inclusive disclose a tiller arm 104 designed to maintain pressure on switch 39 or 40 to give any desired angle or movement of the rudder within limits. In this modifications, the tiller arm 104 is hollow and is mounted for rotary movement with the boss 22 which is rotatable relative to the post 23 as hereinabove described. Fixed to the post 23 is a pulley 105. A loop cable 106 passes over the pulley 105 and has its end 107 secured to a strong spring 108 positioned at the free end 109 of the tiller arm 104. The tension exerted by spring 108 can be adjusted by means of the nut and bolt 111 in the free end 109 of the tiller arm. Spring 108 exerts a force substantially greater than that exerted by the springs which effect automatic opening of the switches 39 and 40. Cable 106 is pinned to the pulley 105 at 112 by means of a threaded bolt 113.

Disposed on the top of box 20 is a rudder position indicator dial 114 desirably of brass which is angularly calibrated as at 115 to indicate the rudder position. A pointer 116 is suitably secured to boss 22. A spring actuated detent 117 is carried by this pointer and is arranged to engage detent drillings 118 (Figure 13) in the rudder position indicator dial 114.

In operation, the tiller arm 104 shown in Figures 12 to 15a is moved to give any desired movement of the rudder 85. Figure 14 shows the relative position of the tiller arm 104 and follower rod 27 when the tiller arm is initially actuated; in this position the cable 106 exerts a torsional force on post 23. Loop cable 106 under the influence of spring 108 continues to exert a torsional force on the post 23 which is proportional to the angular movement of the tiller arm 104. This force causes the actuator slide block to maintain the switches 39 and 40 closed until follower block 31 has been moved a sufficient distance by the actuation of drive cable 50 to return the parts to their normal or equilibrium position where the micro switches 39 or 40 are no longer energized. The detent 117 cooperates with the detent drillings 118 to hold the tiller arm 104 in the position to which it is moved.

When the follower block 31 has been moved sufficiently to relieve the loaded tension on spring 108, as shown in Figure 15, the micro switches 39 or 40, as the case may be, opens and the rudder is maintained locked in the desired angle as hereinabove described. The above described action takes place in both directions of movement of the tiller arm 104, and also takes place when the tiller arm 104 is moved from one selected position to any other selected position.

It will be noted that the present invention provides a controller for operating a rudder, which controller is simple in design, can readily be installed on existing craft because all that is required so to do is to install the control box with the switches in circuit with the electrical system which effects operation of the solenoid valves controlling the flow of pressure fluid to the hydraulic cylinder actuating the rudder post, in those craft in which the rudder post is actuated by such hydraulic cylinder. In installations involving electric motor actuation of the rudder post, modification of such installations to adapt the present invention thereto is likewise a simple task.

It will be further noted that the parts of the controller are standard and readily available. Hence, the initial expense in assembling the controller is relatively low. Also, maintenance expenses are small, if not negligible. This follows from the fact that the parts are readily accessible and the design is such that it is a simple matter to locate the source of trouble, should any occur. Hence, both the expense of the parts and labor required for making repairs is not excessive.

Since certain changes may be made in the above described controller, and different embodiments of this invention could be made without departing from the scope thereof, it is intended that all matter contained in the above description or shown in the accompanying drawings shall be interpreted as illustrative and not in a limiting sense. For example, to keep the rudder from being moved to a position where it would strike the sides of the hull, limit switches are associated with the rudder sector or quadrant so that, when it has moved to a predetermined maximum or limit position in either direction, a limit switch is actuated to cut off power to the solenoid 64 or 65 actuating the directional valve 63 and thus prevent further movement of the rudder in a direction beyond the aforesaid maximum or limit position.

What is claimed is:

1. A controller for actuating a rudder comprising in combination, a controller box, a post mounted for rotary movement in said box, a tiller arm secured to said post for rotating it, a follower-rod carried by said post and movable therewith, an actuating slide block communicably connected with said follower-rod, a follower block having a threaded opening therein, a controller screw mounted for rotation in said box and in threaded engagement with said follower block, a pair of switches on said follower block, the individual switches of said pair being disposed on opposite sides of said actuator slide block, one of said switches being arranged to be closed when said slide block is moved in one direction and the other of said switches being arranged to be closed when said actuator slide block is moved in the opposite direction, means for actuating said rudder and means communicably connecting said controller screw with said rudder actuating means to effect movement of said screw to move said follower block to open the switch of said pair of switches which has been closed by said actuating slide block.

2. A controller for actuating a rudder comprising in combination, a controller box, a post mounted for rotary movement in said box, a tiller arm secured to said post for rotating it, a follower-rod carried by said post and movable therewith, an actuator slide block communicably connected with said follower-rod, a follower block having a threaded opening therein, a controller screw mounted for rotation in said box and in threaded engagement with said follower block, switches on said follower block near the ends thereof and arranged to be actuated by said actuator slide block, said switches controlling the actuating of said rudder, means for centering said slide block on said follower block so that said actuator slide block is maintained out of engagement with said switches except when moved into such engagement with said switches by actuation of said tiller arm, means for actuating said rudder and means communicably connecting said controller screw with said rudder actuating means to effect movement of said screw to move said follower block to open a closed switch after said switch has been engaged by and thus closed by said actuator slide block.

3. A controller for actuating a rudder as defined in claim 2, including pressure fluid means for actuating said rudder, the flow of pressure fluid to said pressure fluid means being controlled by said switches.

4. A controller for actuating a rudder as defined in claim 2 including a reversing motor for actuating said rudder, said switches being in circuit with said reversing motor and controlling the flow of current to said motor.

5. In a steering device comprising in combination, a rudder, means for actuating said rudder, and means for controlling said actuating means, the improvement wherein said last mentioned means comprises a tiller arm, a sliding member communicably connected with said tiller arm for actuation by said tiller arm, a movable block having a threaded opening therein, said sliding member slidably mounted on said movable block, switch means for energizing said actuating means associated with said movable block, said switch means positioned as to be engaged by said sliding member, screw means in threaded engagement with said movable block for moving said block and disengaging said sliding member from said switch means, and means responsive to the movement of said rudder for initiating the movement of said screw means.

6. A controller for a power actuated rudder comprising in combination, a tiller arm, a sliding member communicably connected with said tiller arm for actuation by said tiller arm, a movable supporting member having a threaded opening therein, said sliding member slidably mounted on said supporting member, switch means for energizing said power actuated rudder, said switch means associated with said supporting member and positioned as to be engaged by said sliding member, screw means in threaded engagement with said supporting member for moving said supporting member and disengaging said sliding member from said switch means, and means responsive to the movement of said rudder for initiating the movement of said screw means.

7. A controller for a power actuated rudder comprising in combination, a controller box, a post mounted for rotary movement in said box, a tiller arm secured to said post for rotating it, a follower-rod carried by said post and movable therewith, an actuator slide block communicably connected with said follower-rod, a follower block having a threaded opening therein, a controller screw mounted for rotation in said box and in threaded engagement with said follower block, switches on said follower block near the ends thereof and arranged to be actuated by said actuator slide block, said switches controlling the actuating of said rudder, means for centering said slide block on said follower block so that said actuator slide block is maintained out of engagement with said switches except when moved into such engagement with said switches by actuation of said tiller arm, and means responsive to the movement of said rudder connected to said controller screw for effecting movement of said screw to move said follower block to open a closed switch after said switch has been engaged by and thus closed by said actuator slide block.

References Cited in the file of this patent
UNITED STATES PATENTS

| | | |
|---|---|---|
| 2,175,799 | Hodgman | Oct. 10, 1939 |
| 2,480,334 | Melrose | Aug. 30, 1949 |
| 2,609,165 | Hill | Sept. 2, 1952 |
| 2,843,344 | Gibb | July 15, 1958 |
| 2,890,844 | Cooper et al. | June 16, 1959 |
| 2,924,675 | Addicks | Feb. 9, 1960 |